United States Patent
Derks (10) Patent No.: US 11,064,582 B1
(45) Date of Patent: Jul. 13, 2021

(54) METHOD OF CONTROLLING A SEGMENTED FLASH SYSTEM

(71) Applicant: LUMILEDS LLC, San Jose, CA (US)

(72) Inventor: Henk Derks, Eindhoven (NL)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/632,766

(22) PCT Filed: Jul. 10, 2018

(86) PCT No.: PCT/EP2018/068612
§ 371 (c)(1),
(2) Date: Jan. 21, 2020

(87) PCT Pub. No.: WO2019/016025
PCT Pub. Date: Jan. 24, 2019

(30) Foreign Application Priority Data

Jul. 21, 2017 (EP) .................................... 17182521

(51) Int. Cl.
*H05B 45/14* (2020.01)
*H05B 45/37* (2020.01)
*G03B 15/05* (2021.01)

(52) U.S. Cl.
CPC ............. *H05B 45/14* (2020.01); *G03B 15/05* (2013.01); *H05B 45/37* (2020.01)

(58) Field of Classification Search
None
See application file for complete search history.

(56) References Cited

U.S. PATENT DOCUMENTS

| | | | |
|---|---|---|---|
| 2005/0082553 A1* | 4/2005 | Yamamoto | H05B 45/56 257/83 |
| 2005/0104541 A1 | 5/2005 | Bushell et al. | |
| 2005/0265014 A1 | 12/2005 | Matsui | |

(Continued)

FOREIGN PATENT DOCUMENTS

| | | |
|---|---|---|
| CN | 1638586 A | 7/2005 |
| CN | 1702539 A | 11/2005 |

(Continued)

OTHER PUBLICATIONS

"European Application Serial No. 17182521.9, Communication pursuant to Article 94(3) EPC dated Jun. 19, 2020", 4 pgs.

(Continued)

*Primary Examiner* — Anh Q Tran (74) *Attorney, Agent, or Firm* — Schwegman Lundberg & Woessner, P.A.

(57) ABSTRACT

Systems, methods and devices are descried. A method of controlling a segmented flash having a plurality of flash segments each arranged to illuminate a portion of the scene includes determining an amount of light for illuminating each portion of the scene, measuring forward voltages of each of the flash segments, and adjusting a brightness of each of the flash segments to the determined amount of light for illuminating each portion of the scene. The adjusting is performed by at least one of adjusting a magnitude of a drive current to each of the flash segments, adjusting a duty cycle of the drive current to each of the flash segments, or scheduling a dummy flash, based at least in part on the measured forward voltages.

20 Claims, 6 Drawing Sheets

(56) References Cited

U.S. PATENT DOCUMENTS

| | | | |
|---|---|---|---|
| 2009/0102396 A1 | 4/2009 | Petrucci et al. | |
| 2010/0074610 A1* | 3/2010 | Trevelyan | G03B 15/03 396/158 |
| 2013/0278819 A1* | 10/2013 | Liaw | G03B 15/05 348/370 |
| 2014/0217901 A1 | 8/2014 | Logiudice | |

FOREIGN PATENT DOCUMENTS

| | | |
|---|---|---|
| CN | 101009081 A | 8/2007 |
| CN | 103969920 A | 8/2014 |
| CN | 105812673 A | 7/2016 |
| CN | 106662794 A | 5/2017 |
| CN | 106937440 A | 7/2017 |
| CN | 110892323 A | 3/2020 |

OTHER PUBLICATIONS

"European Application Serial No. 17182521.9, Response filed Sep. 10, 2020 to Communication pursuant to Article 94(3) EPC dated Jun. 19, 2020", 38 pgs.

"European Application Serial No. 18739529.8, Communication pursuant to Article 94(3) dated Jun. 19, 2020", 4 pgs.

"European Application Serial No. 18739529.8, Response filed Sep. 10, 2020 to Communication pursuant to Article 94(3) EPC dated Jun. 19, 2020", 38 pgs.

"International Application Serial No. PCT/EP2018/068612, International Preliminary Report on Patentability dated Jan. 30, 2020", 9 pgs.

"International Application Serial No. PCT/EP2018/068612 International Search Report dated Aug. 20, 2018", 3 pgs.

"International Application Serial No. PCT/EP2018/068612, Written Opinion dated Aug. 20, 2018", 7 pgs.

"Japanese Application Serial No. 2020-502631, Written Amendment dated Jan. 24, 2020", w/ English Translation), 5 pgs.

"Korean Application Serial No. 10-2020-7001774, Amendment filed Feb. 24, 2020", (w/ English Translation), 8 pgs.

"Chinese Application Serial No. 201880049102.9, Office Action dated Mar. 30, 2021", (w/ English Translation), 25 pgs.

* cited by examiner

(prior art)

FIG. 10

METHOD OF CONTROLLING A SEGMENTED FLASH SYSTEM

FIELD OF THE INVENTION

The invention describes a method of controlling a segmented flash system. The invention also describes a segmented flash system.

BACKGROUND OF THE INVENTION

When a conventional flash system is used in photographing a scene, any objects that are too close to the camera may suffer from overexposure and appear too "white" or pale in the image, while objects further away from the camera may not be sufficiently illuminated and appear too dark in the photograph or image. Developments in flash systems have led to a segmented flash, i.e. a flash made up of an array of light sources. The spectra of the light sources deployed in the segmented flash can be chosen to achieve a desired white balance. Each light source illuminates a region of the scene, so that the segmented flash generates an "illumination profile" or pattern. It is possible to determine the relative amount of light required to correctly illuminate or expose each region of the scene, for example by obtaining a depth map using a suitable technique such as time-of-flight (ToF), triangulation, stereo vision, structured light, interferometry etc., and to use this information to determine an optimal illumination profile. With such optimal illumination profile, objects located further from the camera will receive higher light intensities, while objects located closer to the camera will receive less light.

Each flash segment has an LED or other appropriate light source, and the flash segments are individually controllable. The complete illumination profile is achieved by driving each flash segment at an appropriate current level. This is generally achieved by using an appropriate driver that is realized to drive the flash segments with the correct relative and absolute current levels.

However, a problem associated with the known segmented flash systems is the possible occurrence of a relative spectrum shift of one or more segments as a result of different segment temperatures. Different temperatures in the flash segments may be the result of different current driving levels in a previous flash event for which different required levels of light intensity were used according to a depth map to illuminate the different scene regions. For example, one or more segments may have been used to strongly illuminate a scene region, and these flash segments will be hotter than other flash segments that were used to only moderately or weakly illuminate other scene regions. Temperature differences may also occur as a result of different thermal behaviour of the different segments. The problem arises to some extent from the prior art approach of assuming an equilibrium condition for temperature when calculating the drive currents for the flash segments. However, any preceding flash event that used unequal drive currents to achieve correct illumination of the previous scene will disturb any such temperature equilibrium at least for a certain duration following a flash event. Any subsequent flash event within this duration may be associated with a spectrum shift that can result in an unwanted and perceptible colourization of the image, particularly since the human eye is able to detect even only very slight colour variations or nuances around white colour points and skin colour points.

Therefore, it is an object of the invention to provide an improved way of driving a segmented flash to overcome the problems outlined above.

SUMMARY OF THE INVENTION

The object of the invention is achieved by the method of claim 1 of controlling a flash system; any by the segmented flash system of claim 10.

According to the invention, the method of controlling a flash system having a plurality of flash segments comprises the steps of measuring the forward voltages of the flash segments prior to a flash event and/or following a flash event; and subsequently adjusting the brightness of the flash segments on the basis of the measured forward voltages to achieve a desired illumination profile.

In the context of the invention, the expressions "segmented flash" and "matrix flash" may be regarded as synonyms and may be used interchangeably in the following. An advantage of the inventive method is that it is effective in compensating the unwanted colour shift described in the introduction. Any temperature differences between the flash segments, arising as the result of different current driving levels, can be detected and then corrected. The method therefore provides a straightforward way of suppressing or even eliminating such a colour shift.

In a segmented flash, each flash segment can have a different temperature and a different temperature characteristic, and the resulting differences in temperature hysteresis for the various segments means that a prior art method will be unable to always generate a correct illumination profile. In the inventive method, a correct illumination profile can always be ensured by measuring the forward voltages of the flash segments (preferably just prior to a flash event) and then adjusting the brightness of each individual flash segment accordingly. This can be done by adjusting the current to each segment, by adjusting the duty cycles of the individual segments, or by scheduling a dummy flash, as will be explained below.

According to the invention, the segmented flash system comprises a plurality of flash segments arranged in a flash matrix, wherein each flash segment is arranged to illuminate a portion of a scene. The flash system further comprises a flash driver adapted to perform the steps of the inventive method to equalize the temperatures of the flash segments. The flash driver can be controlled by a suitable processor that is realised to determine the optimum current settings based on the forward voltage measurements provided by the flash driver.

The dependent claims and the following description disclose particularly advantageous embodiments and features of the invention. Features of the embodiments may be combined as appropriate. Features described in the context of one claim category can apply equally to another claim category.

Any suitable light sources—or any suitable combination of different light sources—may be used in a segmented flash, for example semiconductor light sources such as light-emitting diodes (LEDs) or vertical cavity surface emitting lasers (VCSELs). In the following, but without restricting the invention in any way, it may be assumed that LEDs are used as the light sources or "emitters" of a segmented flash or flash matrix. For an application such as a camera flash of a mobile device, for example, the total power of the LEDs may be in the region of 6 W, and any suitable sized array may be used, for example a 3×3 array, a 5×5 array, a 15×21 array, etc. The array shape can be square, rectangular, circular, etc. The terms "LED" and "emitter" may be used interchangeably in the following. The emitters of the segmented flash can emit in the visible range, but may alternatively emit in the infrared or ultraviolet range, depending on the application.

The invention is based on the insight that the forward voltage across the forward biased LED(s) of a flash segment is directly related to the temperature of the LED(s), and that any temperature difference between flash segments will result in a voltage differential, which will manifest as a corresponding light output and/or colour shift. Some of all of the flash segments may preferably comprise a plurality of LEDs. In some or all of the segments, the LEDs may preferably have different spectra, chosen to achieve a correct adaptation to the ambient lighting levels or to a desired colour temperature. Preferably, all segments have the same or essentially the same combination of spectra.

A camera—or any apparatus or device that incorporates a camera—may also comprise an embodiment of the inventive segmented flash system. For example, a device incorporating a camera may be a mobile phone, a tablet computer, etc.

The inventive segmented flash system preferably comprises a depth map module that is realized to determine a depth map or 3D profile of a scene. The depth map module is preferably also realised to determine the relative amount of light required to illuminate each portion of the scene. In this way, it is possible to determine the required intensity for each scene region in order to determine the optimal illumination profile for the overall scene.

The severity of a temperature-related colour shift or colourization artefact depends on several factors such as the type of emitters and the colour points of the emitters used in the segmented flash; the thermal resistances between the individual emitters and a base or carrier to which they are mounted; the time interval between flashes; the alteration of emitter optical parameters as a function of temperature; the nature of the scene to be imaged, etc. Assuming a uniformly white scene is to be imaged, any colour shift in the "white scene" can be expressed as a change in the chromaticity coordinates. Preferably, any alteration in the chromaticity coordinates (expressed as du'v' using CIELUV notation) preferably does not exceed a specified threshold (e.g. 0.005 in CIELUV colour space). Of course, any suitable camera colour space system could be used as well.

In a preferred embodiment of the invention, the forward voltages of the flash segments are monitored prior to every flash event, and a suitable corrective measure is taken to ensure that any flash event will be able to provide the optimal illumination profile. This will ensure that colorization artefacts will be essentially completely avoided.

Prior art devices assume that the temperatures of the flash segments will return to equilibrium after a short while, for example within a certain length of time after the user has stopped taking pictures. However, the inventive method ensures that such assumptions need not be made, and always set the correct currents per segments by monitoring the actual temperature of each segment and taking the temperatures into account.

Preferably, the step of measuring the forward voltages of the flash segments is performed under identical low constant current conditions. A low measurement current is used to ensure that the measurement itself does not disturb or falsify the actual temperature distribution. The low current also ensures that the segments are not self-heated during the measurement, as well as keeping energy consumption to a minimum. Measuring the forward voltages is a favourably straightforward way of obtaining the desired information, and is easier than directly measuring the absolute temperatures of the segments, which would require a precise calibration step for each LED. Preferably, the forward voltages are measured after a certain time has elapsed after a flash event. The time instant at which the forward voltages are measured may depend to some extent on the physical and thermal characteristics of the emitters used in the segmented flash.

In addition, the forward voltage monitoring can be applied for a self-test function to detect flash failures. Any flash segment that is open or shorted will be detected during the step of monitoring the forward voltages. The controller can take any faulty LED into account when computing the illumination profile for the remaining healthy LEDs of the segmented flash. Such a detected error condition may be reported to a user, for example as a warning on the screen of the device, or as an error log stored in a memory that can be read out during service or repair.

The measured forward voltages of the flash segments are analog values which are preferably converted to digital values which can be used by a suitable microprocessor to calculate the drive currents required to achieve a desired white balance for a subsequent flash event taking place within a certain time window. For example, an embodiment of a segmented flash may be characterized by a certain time window for a return to a temperature equilibrium state after a flash event. The duration of that time window will depend to some extent on the physical and thermal characteristics of the implemented flash emitters. Therefore, the driver of that segmented flash may implement any corrective measures for a subsequent flash event that takes place within that time window.

After obtaining the measurements for the forward voltages, the driver of the inventive segmented flash system can determine a suitable corrective measure. For example, in a particularly preferred embodiment of the invention, the driver computes a drive current for each individual flash segment on the basis of the differences between the measured forward voltages. In a very simple exemplary case, the segmented flash system may comprise a two-by-two array of four segments. After a flash event used to illuminate a scene for which one of the segments was used to illuminate an object far away from the camera, three of the flash segments have an essentially equivalent measured forward voltage, while the fourth flash segment has a lower forward voltage due to the higher temperature. For a subsequent flash event, current ratios of the flash segments are adjusted. Using the simple example above, the drive current for the three "cool" flash segments is lowered while the drive current for the fourth ("hot") flash segment is raised in order to achieve the correct illuminance distribution and to correct the colour point in a subsequent scene, even if there is a temperature differential across the flash segments. Correction of the colour point is particularly favourable in the case of "tuneable" camera flash systems, for example a segmented flash comprising LEDs with two distinct colour points.

Alternatively or in addition, a corrective measure may comprise a step of determining flash timing (i.e. "flash firing") for the individual flash segments. Instead of tuning the amplitude of the current per segment, the duty cycle per segment can be used for flash firing in the blanking period (the time interval during the integration time of the sensor). It can also be used during integration time if matched to the integration time of the image sensor. In such an embodiment of the inventive method, firing of the flash segments is timed on the basis of the information obtained from the forward voltage monitoring step. For example, a flash segment that is still hot from a previous flash and having a corresponding lower forward voltage event may be timed to be active for slightly longer-duty cycle in order to deliver the required light output during a flash event. Similarly, flash segments that are cooler may be timed to be active for slightly shorter duration. The illumination distribution can be favourably achieved or—in case of a multiple coloured flash having LEDs with more than one colour point—the colour characteristics of the scene can be favourably preserved by such a step of individually timing the flash segments.

The corrective measure(s) described above may be applied when the user of the camera initiates a subsequent flash event, i.e. when the camera is being actively used to capture an image of the scene. Such a flash event is referred to in the following as an "active" flash event. Alternatively, in a further preferred embodiment of the invention, the step of equalizing the temperatures of the flash segments comprises the scheduling of a "dummy" flash event. This dummy flash event is not used by the camera to capture an image of the scene, i.e. it is scheduled outside the integration period of the image sensor. Preferably, the method comprises a step of determining a drive current distribution for the flash segments in the preceding flash event and applying the complement of the drive current distribution for the dummy flash event. A dummy flash is preferably timed to lie outside the exposure interval of the image sensor so that overexposure of an actively captured image will not result. For example, the time interval between a flash event and a dummy flash event is at most 200 ms, preferably at most 50 ms if the camera refresh rate allows this.

In a preferred embodiment of the invention, the flash driver comprises a state machine to efficiently manage the forward voltage measurement steps (the use of a state machine for this purpose can reduce processor load and serial bus loading); a multiplexer configured to select a specific flash segment; an analog-to-digital converter adapted to convert the measured forward voltages into digital values for transferring via a serial bus for example, and a storage means such as a number of registers for temporarily storing the converted forward voltage values.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
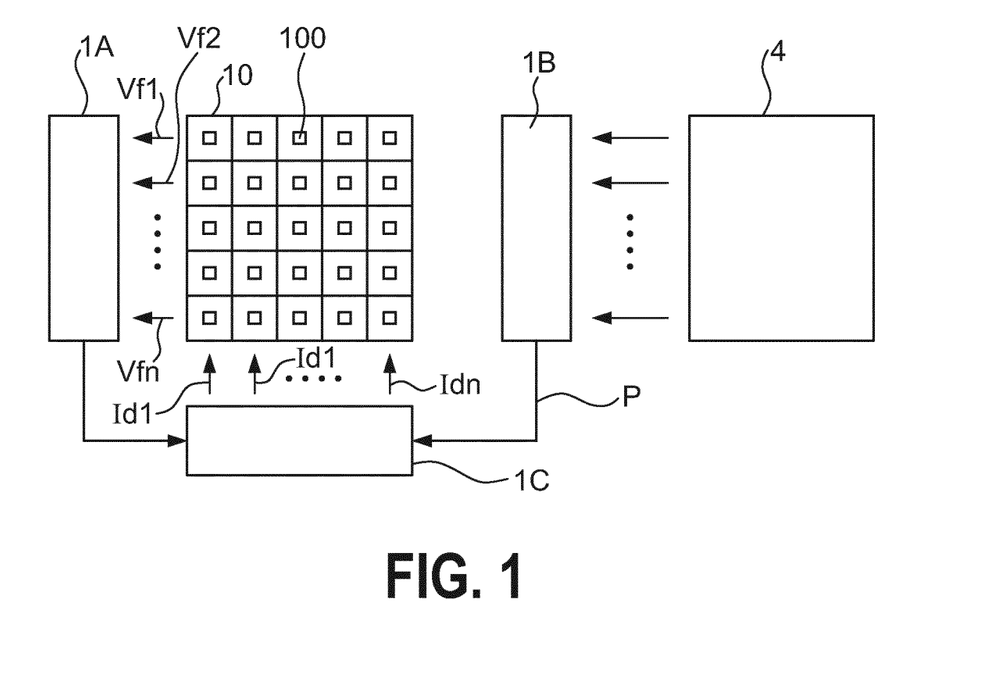
FIG. 1 shows a simplified block diagram of an embodiment of the inventive segmented flash system.

FIG. 1 shows a simplified block diagram of an embodiment of the inventive segmented flash system 1. The diagram shows a segmented flash 10, in this case a 5×5 square array of LEDs 100. The LEDs 100 of this array will illuminate twenty-five regions in a scene. In this exemplary embodiment, an illumination profile P can be provided by a depth map module 1B, which may for example compute the illumination profile P using information obtained by a photodetector 4. The illumination profile P specifies the required intensity or power required for each LED 100 to correctly illuminate the scene, assuming an equilibrium condition in which all LEDs 100 have essentially the same temperature. In this exemplary embodiment, the segmented flash system 1 also comprises a voltage measuring module 1A that measures the forward voltages $Vf1, Vf2, \ldots, Vfn$ of the LEDs 100 of the array. With this information, a controller 1C computes adjusted drive current values $Id1\_a, Id2\_a, \ldots, Idn\_a$ for the LEDs 100 of the array. Each adjusted drive current value $Id1\_a, Id2a, \ldots, Idn\_a$ takes into consideration the required intensity for the corresponding LED 100, but also its temperature (which is related to forward voltage in a well-defined manner). Therefore, even if the flash has recently been used, resulting in an uneven temperature distribution over the array, the controller 1C is able to compute adjusted drive current values $Id1\_a, Id2\_a, \ldots, Idn\_a$ which will result in the desired illumination and which will reduce or even eliminate any undesirable temperature-related illuminance difference and/or colour shift.

Figure 2:
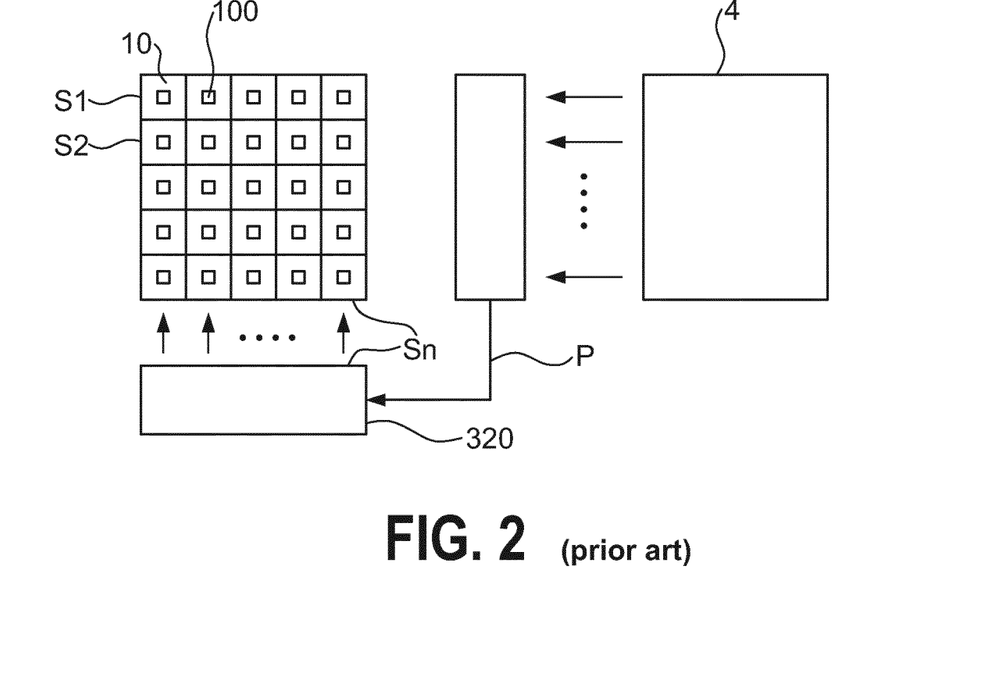
FIG. 2 shows an embodiment of a prior art segmented flash system.

FIG. 2 shows an embodiment of a prior art segmented flash system 3. Here also, a segmented flash 10 comprises a 5×5 square array of LEDs 100. The prior art flash system 3 also uses a depth map module to compute an illumination profile P from the feedback provided by an image sensor, and forwards this to a controller 320. The illumination profile P specifies the required intensity or power required for each LED 100 to correctly illuminate the scene, but assumes an equilibrium condition in which all LEDs 100 have essentially the same temperature. However, as explained above, if the flash has recently been used, there may be an uneven temperature distribution over the array, resulting in an undesirable colour shift in the image captured with the subsequent flash event.

Figure 3:
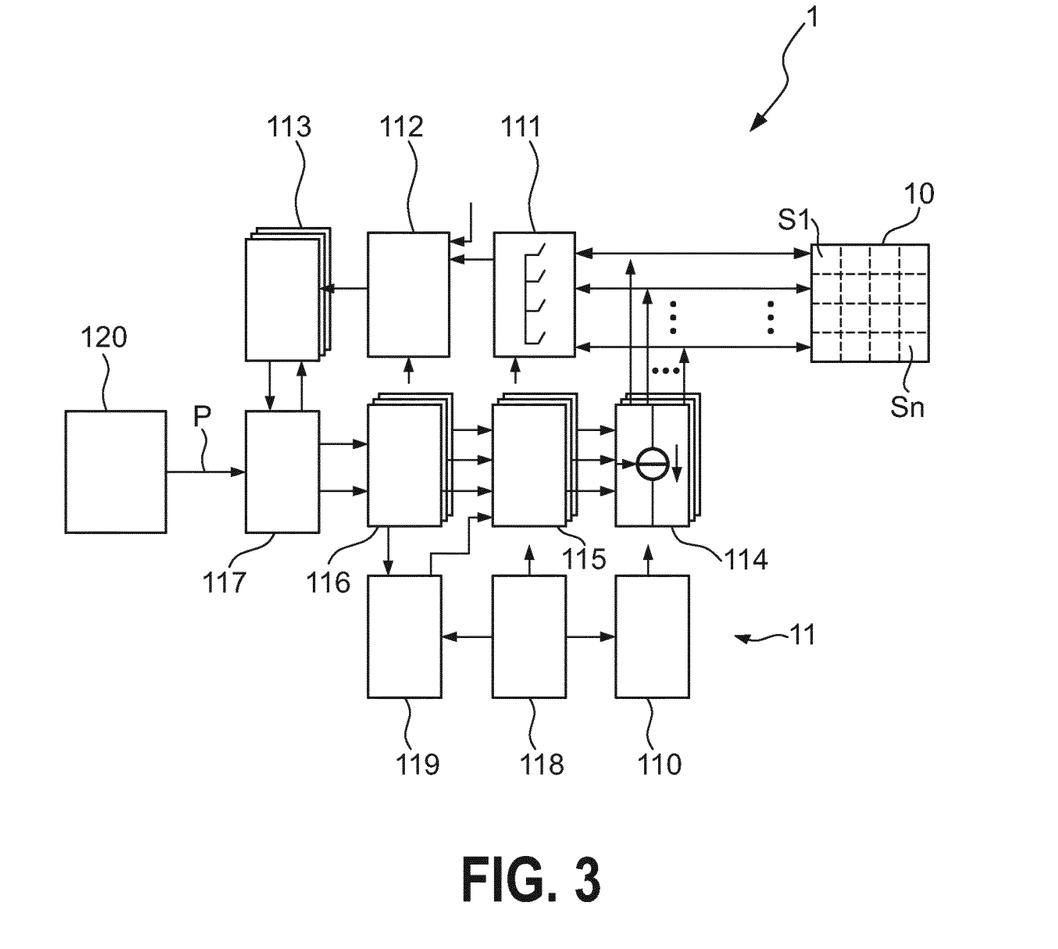
FIG. 3 shows a more detailed block diagram of an embodiment of the inventive segmented flash system.

FIG. 3 shows a more detailed block diagram of an embodiment of the inventive segmented flash system 1 of FIG. 1. The diagram shows relevant blocks or modules in a flash driver 11 that drives the LEDs of a segmented flash 10. In this exemplary embodiment, the flash driver 11 comprises a multiplexer 111 configured to connect a specific flash segment $S1, S2, \ldots, Sn$ to an analog-to-digital converter 112 so that the forward voltage $Vf1, Vf2, \ldots, Vfn$ of the selected flash segment $S1, S2, \ldots, Sn$ can be converted to a digital value; and a number of registers 113 to store the digital values. These blocks 111, 112, 113 fulfil the function of the voltage measuring module 1A of FIG. 1. Each flash segment is also connected to a current sink 114. An illumination profile P is computed by a suitable processor unit 120 for a subsequent flash event on the basis of the measured forward voltages $Vf1, Vf2, \ldots, Vfn$. The illumination profile P can be a set of drive current values for the subsequent flash event. These are stored in a memory 116, converted by a digital-to-analog converter 115 and then applied to the current sinks 114 during the subsequent flash event. The timing of the various blocks can be controlled using a clock oscillator 118 and a counter 119, as will be known to the skilled person. Communication with the processor unit 120 can be done over a suitable interface 117 such as an I²C interface. The processor unit 120 and its related blocks 114, 115, 118, 119 etc. fulfil the function of the depth map module 1B and the controller 1C of FIG. 1. The processor unit 120 computes the amplitude and/or timing of a drive current Id1_a, Id2_a, . . . Idn_a to achieve the desired illumination profile P. A state machine 110 is used to control the related blocks. The forward voltages Vf1, Vf2, . . . , Vfn are preferably measured prior to each flash event, and the adjusted drive currents Id1_a, Id2_a, . . . Idn_a are used if a successive flash event takes place during a time interval that is shorter than the time needed for the array to return to an equilibrium state as regards temperature.

Figure 4:
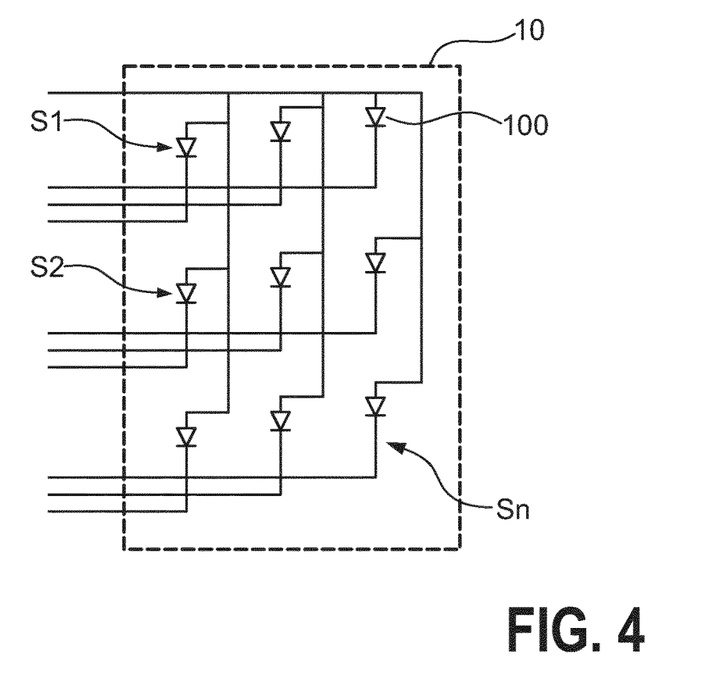
FIGS. 4 and 5 show embodiments of a segmented flash.
Figure 5:
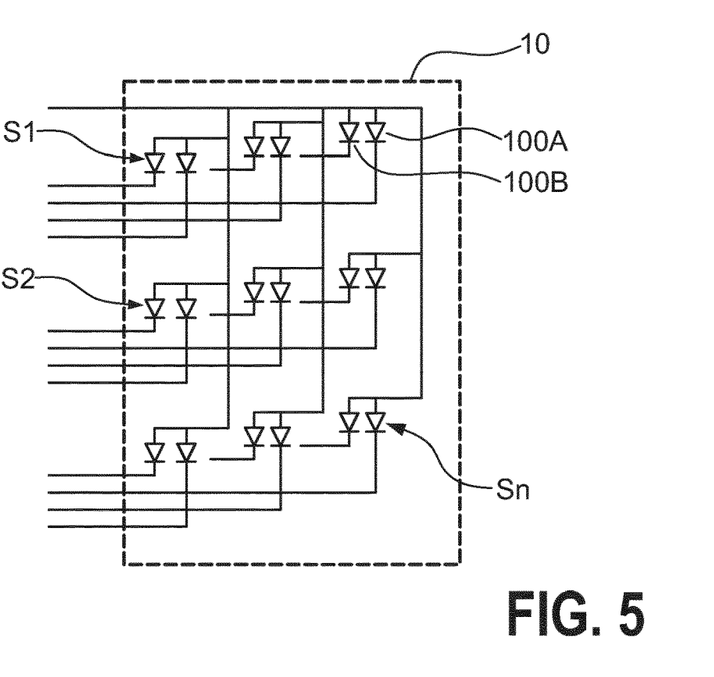

FIGS. 4 and 5 show embodiments of a segmented flash 10 that can be driven by the driver 11 of FIG. 3. In FIG. 4, each flash segment S1, S2, . . . , Sn comprises one LED 100. In FIG. 5, each flash segment S1, S2, . . . , Sn comprises two LEDs 100A, 100B. The LEDs 100A, 100B can have different spectra. In these embodiments, the LEDs are all driven in parallel. An alternative realisation could use row or column scanning of the matrix, thereby requiring a smaller number of interconnects and a smaller number of current sources in the driver circuit.

Figure 6:
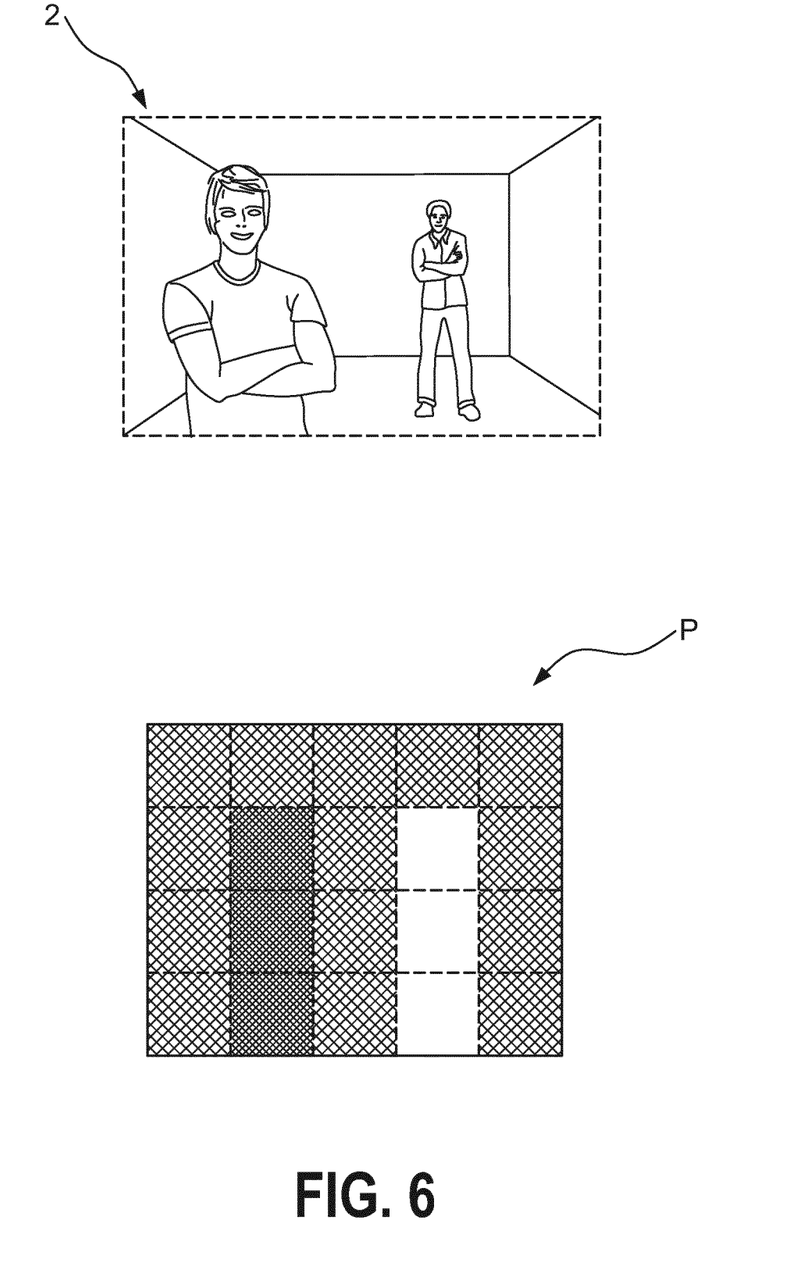
FIG. 6 shows an illumination profile in relation to a corresponding scene.

FIG. 6 shows a scene 2 and a corresponding illumination profile P. Here, the scene 2 shows two figures, one of which is closer to the camera, and one of which is further away. The figure on the left will need less illumination that the figure on the right in order to correctly illuminate the scene 2. This can be determined using a time-of-flight technique, and the resulting depth map is used to generate the optimal illumination profile P. Using the 5×5 segmented flash described above, three of the LEDs will be driven at a higher power (these are shown by the light squares in the illumination profile P), and three of the LEDs will be driven at a lower power (these are shown by the darkest squares in the illumination profile P). The difference in intensity or power will result in a temperature differential over the segmented array, and it may take some time for the array to return to a temperature equilibrium state. In the prior art approach, if a subsequent flash event takes place in that time, a colour shift may become apparent in the image. Using the inventive method, the adjusted drive currents are computed to compensate for any such temperature differential, and there will not be any noticeable colour shift in an image captured with a subsequent flash event.

Figure 7:
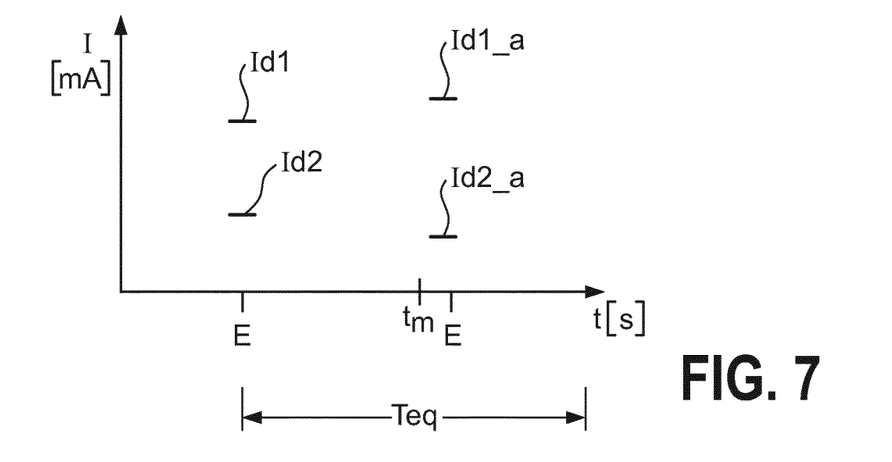
FIGS. 7-9 show successive flash events scheduled using an embodiment of the inventive method.
Figure 8:
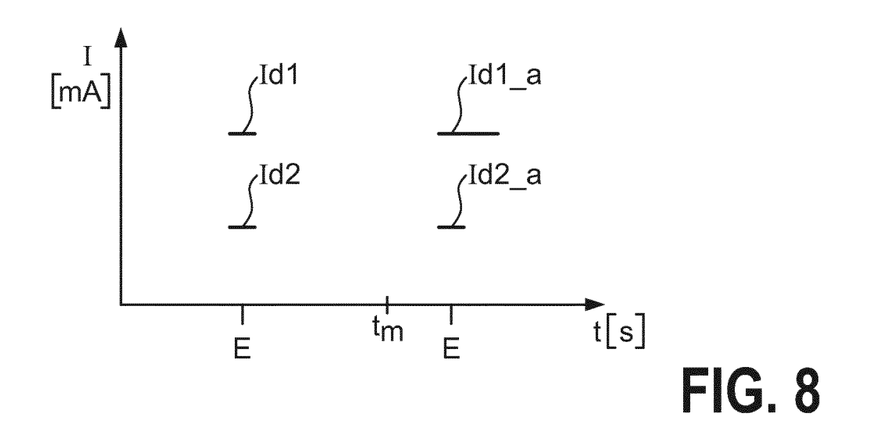
Figure 9:
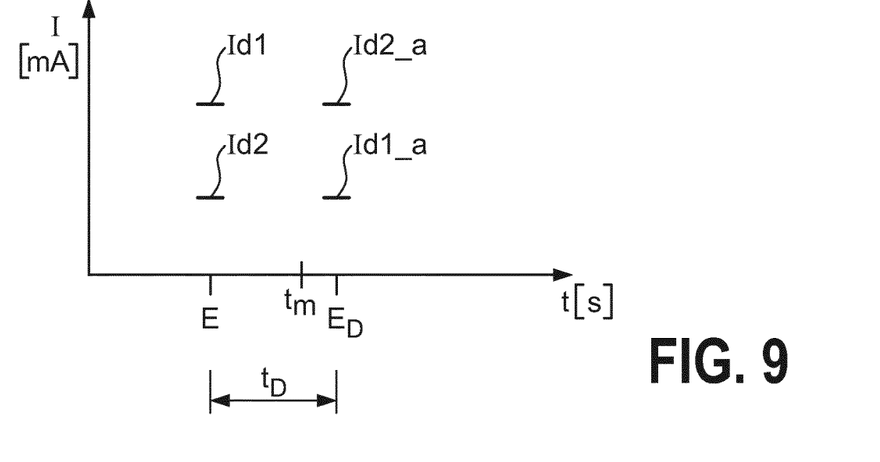

FIGS. 7-9 show successive flash events scheduled using an embodiment of the inventive method. For the sake of simplicity, it is assumed that the same scene is being photographed during each flash event, and that the illumination profile is the same for both scenes (of course, the scene and the corresponding illumination profile may be different). To keep the explanation simple, only two LEDs are considered in each case, namely the LEDs with the highest and lowest intensities. In the first flash event, one LED receives a relatively high drive current Id1, and the other LED receives a relatively low drive current Id2. The time Teq required for the segmented flash to return to an equilibrium condition is indicated in the diagram. Prior to each subsequent flash event, at time $t_m$, the forward voltages of the flash segments are measured. In FIG. 7, the drive currents in the subsequent flash event are adjusted to correct for any temperature differential detected by discrepancies in the forward voltage values Vf1, Vf2, . . . , Vfn. Here, the LED that received the highest drive current Id1 in the first event E will, in the subsequent event E, receive a drive current that is adjusted upwards. Similarly, the LED that received the lowest drive current Id2 in the first event E will, in the subsequent event E, receive a drive current that is adjusted downwards.

In FIG. 8, the flash timing is adjusted in a subsequent event. The diagram shows that the LED that received the highest drive current Id1 (or longest duty cycle) in the first event will be driven for a slightly longer time to compensate for its poorer performance in the subsequent flash event. Similarly, the LED that received the lowest drive current Id2 (or shortest duty cycle) in the first event E will, in the subsequent event E, be driven for a slightly shorter time. These corrections for "hot" and "cold" flash segments result in the desired illuminance distribution P.

In FIG. 9, a flash event E is followed shortly after by a dummy flash event $E_D$. In the dummy flash event $E_D$, the adjusted LED drive currents Id1_a, Id2_a are the complement of the LED drive currents Id1, Id2 for the active flash event E. The LED that received the higher drive current will now receive a lower drive current, and vice versa. This effectively "forces" a return towards temperature equilibrium over the entire array. The dummy flash event $E_D$ takes place within the relatively short time $t_D$, which is shorter than the interval Teq required for the segmented flash to return to an equilibrium condition as indicated in FIG. 7. The dummy flash event $E_D$ allows correction of colour shift between flash segments of a matrix for which the LEDs all have the same colour.

Figure 10:
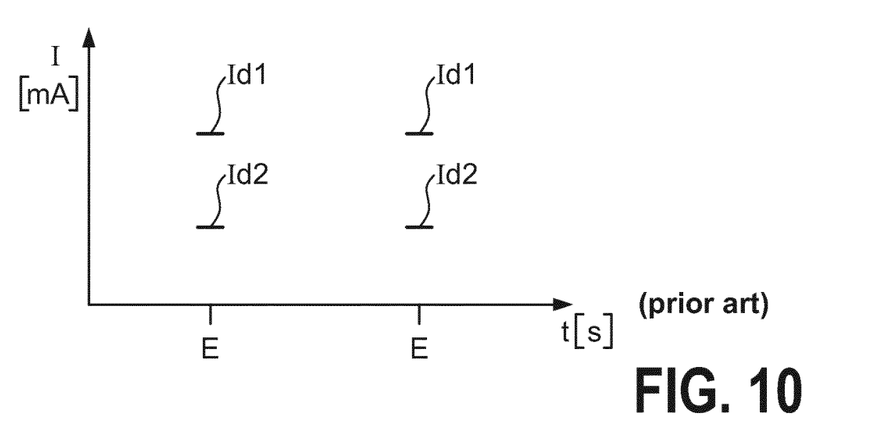
FIG. 10 shows successive flash events scheduled using a prior art method.

FIG. 10 shows successive flash events E scheduled using a prior art method. Here, there is no compensation for any possible temperature differential during a subsequent flash event E, and the LEDs receive the same drive currents Id1, Id2 in each flash event E. The "hotter" LEDs may fail to deliver the desired brightness, however, and a brightness delta or colour shift may be noticeable in the subsequent image, particularly in the case when one or more flash segments comprise LEDs of different colours that are mixed "in scene" when the flash segment is turned on. Although the present invention has been disclosed in the form of preferred embodiments and variations thereon, it will be understood that numerous additional modifications and variations could be made thereto without departing from the scope of the invention. For example, besides the flash applications described above, video lighting may benefit from similar current corrections or duty cycle corrections of a multi-segment video light.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

REFERENCE SIGNS segmented flash system 1
voltage measuring module 1A
depth map module 1B
controller 1C
segmented flash 10
light source 100, 100A, 100B
flash driver 11
state machine 110
multiplexer 111
analog-to-digital converter 112
memory 113
current sources 114
digital-to-analog converter 115
memory 116 interface 117
oscillator 118
counter 119
processor 120
scene 2
prior art segmented flash system 3
controller 320
image sensor 4
flash segment S1, S2, . . . , Sn
forward voltage Vf1, Vf2, . . . , Vfn
flash event E
dummy flash event $E_D$
time interval $T_{eq}$
drive current Id1, Id2
adjusted drive current Id1_a, Id2_a, . . . , Idn_a
illumination profile P

The invention claimed is:

1. A method of controlling a segmented flash having a plurality of flash segments each arranged to illuminate a portion of a scene, the method comprising:
   determining an amount of light for illuminating each portion of the scene;
   measuring forward voltages of each of the plurality of flash segments; and
   adjusting a brightness of each of the plurality of flash segments to the determined amount of light for illuminating each portion of the scene by at least one of adjusting a magnitude of a drive current to each one of the plurality of flash segments, adjusting a duty cycle of the drive current to each of the plurality of flash segments, or scheduling a dummy flash, based at least in part on the measured forward voltages.

2. The method according to claim 1, wherein the measuring the forward voltages of each of the plurality of flash segments is performed under identical low constant current conditions.

3. The method according to claim 1, wherein the adjusting the brightness of each of the plurality of flash segments comprises computing an adjusted drive current for each of the plurality of flash segments based at least in part on the measured forward voltages of each of the plurality of flash segments.

4. The method according to claim 1, wherein the adjusting the brightness of each of the plurality of flash segments comprises adjusting the duty cycle of the drive current to each individual one of the plurality of flash segments.

5. The method according to claim 1, wherein the adjusting the brightness of each of the plurality of flash segments comprises scheduling a dummy flash event.

6. The method according to claim 5, further comprising:
   determining a drive current distribution for the plurality of flash segments in a preceding flash event; and
   applying a complement of the drive current distribution for the dummy flash event.

7. The method according to claim 1, further comprising:
   detecting a faulty flash segment of the plurality of flash segments based on the measured forward voltages; and
   adjusting the brightness of remaining flash segments of the plurality of flash segment to achieve an illumination profile for the segmented flash (10).

8. The method according to claim 1, wherein the measuring the forward voltages of each of the plurality of flash segments comprises measuring analog voltages of each of the plurality of flash segments, and the method further comprises converting the measured analog voltages to digital values.

9. The method according to claim 1, wherein the determining the amount of light for illuminating each portion of the scene comprises providing one of a depth map or a three-dimensional (3D) profile of the scene.

10. A segmented flash system comprising:
    a segmented flash comprising a plurality of flash segments, each of the plurality of flash segments having a location corresponding to a portion of a scene; and
    a flash driver comprising:
       an analog-to-digital converter,
       a multiplexer that connects each of the plurality of flash segments to the analog-to-digital converter to provide analog measurements of a forward voltage of each of the plurality of flash segments to the analog-to-digital converter,
       a number of registers, coupled to the analog-to-digital converter, that store digital values, corresponding to the analog measurements of the forward voltage of each of the plurality of flash segments,
       a processor configured to determine at least one of an amplitude and a timing of a flash segment drive current based at least on the digital values stored in the registers, and
       a state machine configured to control at least the multiplexer and the analog-to-digital converter to measure the forward voltage of each of the plurality of flash segments and store the digital values in the registers after a flash event.

11. The segmented flash system according to claim 10, further comprising a depth map module configured to determine a relative amount of light to illuminate each portion of the scene.

12. The segmented flash system according to claim 10, wherein each of the plurality of flash segments comprises a plurality of light sources.

13. The segmented flash system according to claim 12, wherein each of the plurality of light sources of each of the plurality of flash segments have different spectra.

14. A device comprising:
    an image sensor; and
    a segmented flash system comprising:
       a plurality of flash segments, each of the plurality of flash segments having a location corresponding to a portion of a scene, and
       a flash driver comprising:
          an analog-to-digital converter,
          a multiplexer that connects each of the plurality of flash segments to the analog-to-digital converter to provides analog measurements of a forward voltage of each of the plurality of flash segments to the analog-to-digital converter,
          a number of registers, coupled to the analog-to-digital converter, that store digital values, corresponding to the analog measurements of the forward voltage of each of the plurality of flash segments,
       a processor configured to determine at least one of an amplitude and a timing of a flash segment drive current at least on the digital values stored in the registers, and
       a state machine configured to control at least the multiplexer and the analog-to-digital converter to measure the forward voltage of each of the plurality of flash segments and store the digital values in the registers after a flash event.

15. The device according to claim 14, wherein the device is one of a mobile phone, a tablet computer, or a camera.

16. The device according to claim 14, wherein the segmented flash system further comprises a depth map module configured to determine a relative amount of light to illuminate each portion of the scene.

17. The device according to claim 14, wherein each of the plurality of flash segments comprises a plurality of light sources.

18. The device according to claim 17, wherein each of the plurality of light sources of each of the plurality of flash segments have different spectra.

19. The device according to claim 14, wherein each of the plurality of flash segments comprises a single light source.

20. The segmented flash system according to claim 10, wherein each of the plurality of flash segments comprises a single light source.

* * * * *

UNITED STATES PATENT AND TRADEMARK OFFICE
CERTIFICATE OF CORRECTION

PATENT NO. : 11,064,582 B1
APPLICATION NO. : 16/632766
DATED : July 13, 2021
INVENTOR(S) : Henk Derks It is certified that error appears in the above-identified patent and that said Letters Patent is hereby corrected as shown below:

On the Title Page

In item (87), in "PCT Pub. Date", in Column 1, Line 2, after "2019", insert
--¶(65) Prior Publication Data
US 2021/0195705 A1 Jun. 24, 2021--

In the Claims

In Column 9, Line 60, in Claim 7, delete "segment" and insert --segments-- therefor In Column 9, Line 61, in Claim 7, delete "flash (10)." and insert --flash.-- therefor In Column 10, Line 49, in Claim 14, delete "provides" and insert --provide-- therefor Signed and Sealed this
Nineteenth Day of July, 2022

Katherine Kelly Vidal
*Director of the United States Patent and Trademark Office*